Figure 1:
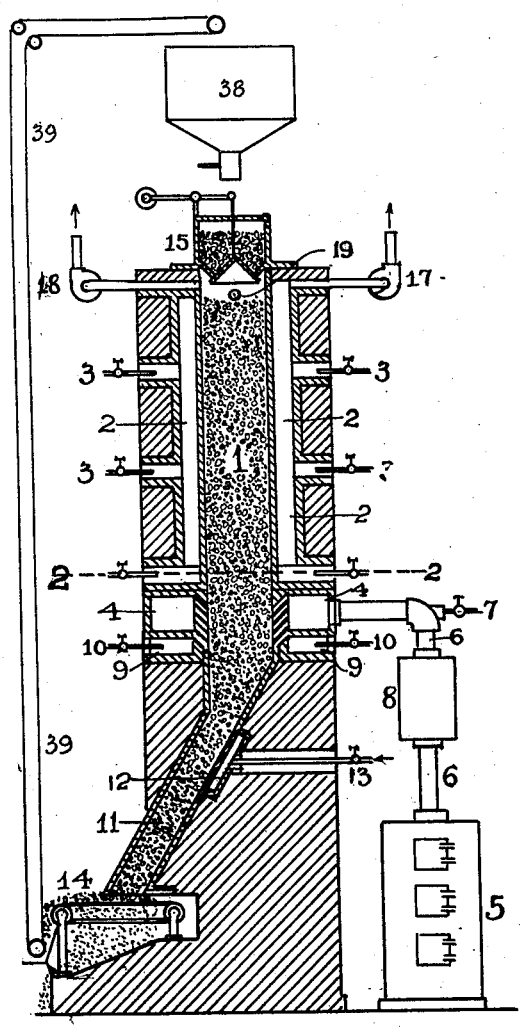

May 18, 1926.

W. E. GREENAWALT

METALLURGICAL APPARATUS

Filed August 19, 1924

1,585,344

INVENTOR
William E. Greenawalt

Patented May 18, 1926.

1,585,344

UNITED STATES PATENT OFFICE.

WILLIAM E. GREENAWALT, OF DENVER, COLORADO.

METALLURGICAL APPARATUS.

Application filed August 19, 1924. Serial No. 732,974.

The invention relates in general to metallurgical apparatus and may be used for a variety of purposes, but it is directed more particularly to the treatment of material in shaft furnaces, without fusion, in a reducing or non-oxidizing atmosphere, for the production of precipitating agents, such as hydrogen sulphide or metallic iron, for the precipitation of copper from solutions, and to the sulphatizing or chloridizing of ores to facilitate the extraction of the metals by leaching. It is not intended, however, to limit the apparatus to these applications.

In my Patent No. 1,218,996, March 13, 1917, I pointed out certain advantages of introducing air or other gases, such as sulphur dioxide or chlorine, to oxidize, sulphatize, or chloridize ore in a shaft furnace by introducing the gas through twyers into the hot ore. The present invention may be considered, an improvement on the process described and a suitable apparatus for carrying out the improved process. The improved process is described in my pending application, Serial No. 630,993, filed April 9, 1923, and the present apparatus application may be considered in part as a division of the process application.

In my Patents, No. 1,340,826, May 18, 1920, and No. 1,357,495, Nov. 2, 1920, it is pointed out that in the treatment of copper ores by leaching and electrolysis some of the copper has to be precipitated from the lean and foul solutions with a chemical precipitant, such as hydrogen-sulphide or metallic iron, although hydrogen sulphide is preferred. It follows, therefore, that the cheap and effective production of these precipitants for copper, at the mine, is a very important matter, whether the precipitants are used in connection with the process indicated, or with other processes.

In the production of hydrogen sulphide by the reaction between carbon or a hydrocarbon, sulphur dioxide or a sulphide ore, and steam or a hydrogen containing gas, the difficulty has been to get continuous operation and reliability in the production of large quantities of the gas, as required for precipitation in copper leaching.

In the production of iron, for precipitation purposes, the practice has been to reduce leach pyritic residues to metallic iron in a reducing atmosphere. The difficulty in the production of sponge iron has been to prevent re-oxidation on exposure to the air after the iron was taken from the furnace. Great care is required to prevent re-oxidation before the iron is removed from the furnace, as it goes from a reducing to an oxidizing atmosphere, and even then a large portion of the iron, in sponge iron, may be re-oxidized, so that the resulting product may be very inferior for the purpose intended. In the present apparatus this difficulty is largely overcome, and excellent iron may be produced for precipitation purposes without taking any unusual precaution against re-oxidation.

In sulphatizing ores it is known that sulphur dioxide gas is effective in sulphatizing most of the metals in the ore, if applied at the right temperature. Temperature regulation is of importance, also the concentration of the gas. Steam materially assists the reactions to sulphatize.

Chlorine can be effectively applied to ores to chloridize most of the metals desired, and, as in sulphatizing, temperature regulation is of importance, and steam is of assistants.

Figure 3:
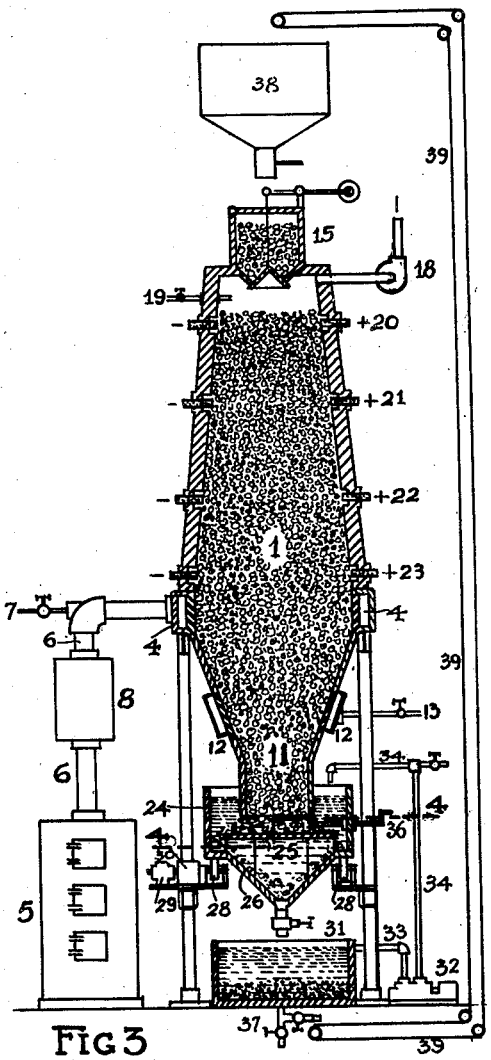
Figure 2:
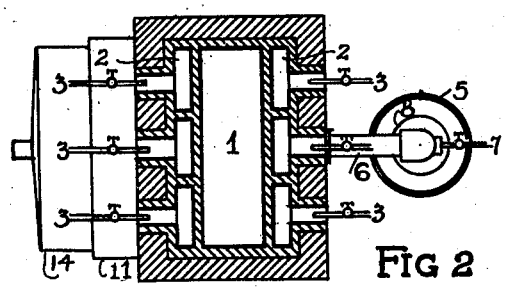
Figure 4:
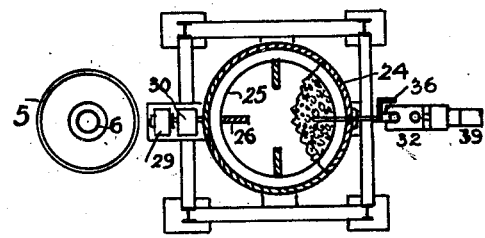

In describing the apparatus reference may be made to the accompanying drawings, in which Fig. 1 shows a vertical section of one form of the apparatus suitable for oil or gas heating, and Fig. 2 shows the corresponding horizontal section on the line 2—2 of Fig. 1. Fig. 3 shows a vertical section of another form of the apparatus adapted to electric heating, and Fig. 4 shows the corresponding horizontal section on the line 4—4 of Fig. 3.

The apparatus will first be described in connection with the sulphatizing or chloridizing of ores, having in mind more particularly the form of apparatus as shown in Figs. 1 and 2.

The furnace consists, essentially, of a shaft 1, adapted to receive the ore to be treated. The shaft is flanked on both sides by flues, or combustion chambers 2 to maintain the ore at the temperature desired. Oil or gas fuel is injected into the flues or combustion chambers through the pipes 3, which are preferably arranged at different elevations, so that the temperature of the ore may be regulated and maintained as desired. Gas, such as sulphur dioxide, is forced into the shaft 1 and into and through the ore, through the twyers 4 which are designed with sloping partitions so that the ore may slide downwardly without getting into the twyer chamber, while at the same time the air or gas may flow unobstructedly into the ore in the shaft of the furnace. The gas is supplied by the gas generator 5 which, in the case of sulphur dioxide, may be an ordinary roasting furnace or sulphur burner. The gas is exhausted from the gas generator 5 through the pipe 6 by means of a steam injector 7, which exhausts the gas from the generator and forces it through the twyers into the furnace. It may be desirable at times to heat the gas; for this purpose a super-heater 8 is placed in the pipe line 6 to heat the gas to the temperature desired. Super-heating may also be provided for by a burner 9 under the twyer which may be supplied with oil or gas through the pipes 10. This heater would prevent condensation of steam in the twyer chamber, if the inflowing gas or steam is at a lower temperature than the boiling point of water.

It is preferred to have a long hopper 11 below the twyers to prevent gas from blowing out downwardly and to allow sufficient time for cooling and treating the ore. Gas, steam, or any other cooling or reacting medium may be introduced into the ore below the twyers through the injector 12 which communicates with a gas supply pipe 13, to facilitate or retard chemical reaction during cooling, to cool the ore, and to provide heated gas or steam for the furnace above the cooling injector 12. The cooling injector is designed similar to the twyers, so as to allow the ore to slide over it while the gas is injected into the ore. At the bottom of the furnace is a feeder 14 adapted to slowly remove the cooled ore from the furnace, and is preferably operated so that the ore will have a slow continuous downwardly movement through the furnace: this is desirable, because it frequently happens that the ore acquires a " set " or agglomeration, if it remains stationary for a long time, under sulphatizing or chloridizing treatment. The ore is charged into the furnace through the hopper 15. The elevator 39 delivers the ore to the hopper. The exhauster 18 creates an upward draft in the ore column, and the exhauster 17 makes the draft for the flues or combustion chambers 2. A spray nozzle 19 is provided in the upper part of the furnace to cool the top of the ore if it should get too hot, and also to cool escaping gas to prevent detrimental reactions after the gas leaves the furnace. If it should be desired to return some of the ore, or material from the furnace, as the portion of a new charge, the material desired to be returned may be fed into the elevator 39 by the feeder 14, and if it is desired to screen the material the feeder 14 may be constructed as a screen so that the fines will pass through, while the coarser portion may be returned. If, for example the furnace is used to make hydrogen sulphide by using coke as a reducing agent, it will be desirable to use excess coke in the furnace, and then screen the ash from the coke and to return the excess coke back to the furnace as a portion of a new charge.

In operating the furnace, the ore is charged into it, preferably hot, and coming directly from a roasting or oxidizing furnace, in the treatment of sulphide ores, as, for example, the ore from the roasting furnace 5 which furnishes the sulphur dioxide gas. When the shaft is full of ore, it is heated to the desired temperature by the hot walls of the furnace shaft, by burning oil or gas in the flues or combustion chambers 2. The reacting gas, as for example, sulphur dioxide, is then introduced into the hot ore, preferably with steam, through the twyers 4, and passes upwardly through the ore, assisted by the suction produced by the exhauster 18. Steam is preferably introduced with the gas to facilitate desired chemical reactions. In sulphatizing the ore, a very concentrated gas can be applied in this way at any desired temperature. The most desirable temperature for the ore will usually range from 800 to 1200 deg. F. By means of the feeder 14 the ore flows downwardly in a slow continuous stream, thus avoiding caking or agglomerating, and consequently clogging of the ore in the furnace.

The ore in the shaft, as it passes below the twyers, may be given further treatment by injecting gas into it through the gas injector 12. If it is desired to cool the ore in a reducing atmosphere a reducing gas is introduced through the injector 12, while at the same time the gas is pre-heated for use in the upper portion of the furnace. Similarly, air may be introduced through the injector 12, if it is desired to cool the ore in an oxidizing atmosphere. Steam may also be introduced through the injector 12 to assist in cooling and in promoting desired chemical reactions during cooling, while at the same time the steam is super-heated for use in the upper portion of the furnace.

If the ore is given a sulphatizing or chloridizing treatment in the furnace, none of the treated material residue will usually be returned to the upper portion of the furnace shaft; in which case the elevator 39 will be used only for a new charge.

The apparatus will now be described in reference to the production of hydrogen sulphide, for the precipitation of copper from leach solutions, and it will be understood that no great purity of the gas is required for this use.

Practically all copper mines can produce both sulphide and oxide ores. Before sulphide ore can be conveniently leached it has to be roasted, or oxidized; at the same time large quantities of sulphur dioxide are produced, which is wasted. One object of the present invention is to use this sulphur dioxide in the production of hydrogen sulphide. It has long been known that carbon, in a reducing atmosphere and at elevated temperatures, will reduce the sulphur dioxide and liberate sulphur in its elemental condition, and that if hydrogen or a hydrogen containing gas is brought in contact with the sulphur under these conditions, hydrogen sulphide will be formed.

Coke is preferably used in carrying out the process, and the pieces should be in moderate sizes, say from one fourth inch to several inches in dimensions. It is also preferred to have the coke free from fines, or at least from any unusual amount of fines. The coke, so prepared, is charged into the shaft 1 of the furnace; reference being made more particularly to Figs. 3 and 4 of the drawing. The furnace is designed so that the coke may be heated to incandescence in a neutral, or non-oxidizing, atmosphere preferably by means of an electric current. It is preferred to have a high column of coke above the twyer zone and a deep column of residue below the twyer zone. Coke offers peculiar advantages for electrical heating. The electrodes for heating the charge are arranged at different elevations, as designated by 20, 21, 22, and 23, so that the temperature at the different elevations can be controlled as desired, by regulating the amount of electricity supplied to each set of electrodes. The sulphur dioxide is exhausted from the roasting furnace, or sulphur burner 5 and flows through the pipe 6 into the twyer 4 and into the shaft 1 of the furnace. A steam ejector 7 sucks the gas from the roaster 5 and forces it into the furnace, and this steam may supply the hydrogen necessary for the reaction in the production of hydrogen sulphide, altho hydrogen gas or a hydrocarbon fluid may be used, either alone or in connection with the steam. An exhauster 18 at the top of the furnace creates a flow of the gas upwardly through the interstices of the coke, and the suction produced by the exhauster 8 and the column of residue below the twyer zone prevents gas from escaping at the bottom of the furnace. The escape of gas may be further guarded against by a liquid seal 24 arranged in connection with the residue outlet of the furnace. Fluid, such as steam, air, or a hydrocarbon gas may be introduced into the lower portion 11 of the furnace through the injector 12, to cool the residue as it descends and to supply steam or a reacting substance in the upper portion of the furnace.

For some purposes it is desirable to exclude air from the furnace until the material in the lower portion of the shaft is quite cool; this may be done by the arrangement shown in Fig. 3 in which a tank 24 is positioned below the furnace outlet, so that liquid in the tank acts as a liquid seal for the lower portion of the furnace. The tank is rotatably mounted on rollers 28. Internally, the tank is provided with a diaphragm 25, at some distance from the bottom, which is supported by the uprights 26, connecting with the sloping bottom of the tank. When the tank is rotated the material is scraped off the diaphragm or plate 25 by the scraper 36, and goes down the sloping sides of the tank toward the outlet at the bottom, where it flows out with an amount of liquid. The liquid and residue from the furnace may flow into a tank 31, where the residue settles to the bottom, while the clear liquid may be drawn from the top, and is returned to the tank 24 through the pipe line 33, the pump 32, and the pipe line 34. The residue may be removed from the tank, and if desired, some of it may be returned to the top of the furnace with a new charge of material. If the material is coke, the clean washed excess is returned with fresh coke for re-use. The amount of residue discharged from the furnace, with a certain speed of the rotary tank 24, may be regulated by the scraper 36, which rotates with the tank and digs into the material on the plate 25. The tank is rotated by means of the motor 29 and the speed reducer 30.

In the operation of the furnace for the production of hydrogen sulphide, coke is charged in on top, and a bed of residue, consisting of ash and unconsumed coke, may be presumed to fill the lower portion of the shaft below the twyers. The coke, prepared as described, allows a free flow of gas through the interstices from the twyers to the exhaust outlet at the top of the furnace. The electrical conductivity of the coke is such that it can be heated by the electric current without unusual consumption of power. In heating the coke for the purpose intended, it is desirable to have a fairly high temperature just above the twyer zone and the temperature should decrease toward the top. This can be done by regulating the electric current flowing through the electrodes at the different elevations.

The temperature near the twyers should be maintained at from 750 to 1000 deg. C. At these temperatures the sulphur dioxide is dissociated, especially in the presence of steam or of a hydrogen containing gas. Since hydrogen sulphide is dissociated at from 400 to 500 deg. C., the temperature in the upper portion of the furnace should not greatly exceed this limit. If there is a tendency for the issuing gas to exceed this temperature, a fine water spray may be introduced in the upper portion of the furnace, above the coke, through the fine spray nozzle 19.

When the furnace is at the proper temperature, the sulphur dioxide is introduced into it from the roasting furnace 5 through the twyers 3. Steam is introduced with the gas, and this steam can be used to give the necessary draft in the roasting furnace and a slight pressure at the twyers, by introducing it into the pipe 6 through the injector 7.

The sulphur dioxide, coming in contact with the hot coke and steam, produces hydrogen sulphide. The reactions may be expressed as follows:

$$SO_2 + 3C + H_2O = H_2S + 3CO$$
$$SO_2 + 2CO = S + 2CO_2$$
$$S + 2H = H_2S.$$

The oxygen from the sulphur dioxide, as also from the steam or from a hydrogen containing gas, uniting with the hot carbon, produces considerable heat, and this tends to considerably diminish the electrical energy required to keep the coke at the desired temperature. The coke is also consumed in this way and produces ash, and this ash if allowed to accumulate until all the carbon of the coke is consumed, would clog the furnace, produce uneven percolation of the gas through the coke column, and make the process unsatisfactory. To avoid this, it is preferred to keep a continuous, or practically continuous, movement of the coke downwardly, and it is preferred not to carry the process to the complete combustion of the coke. By a continuous, or practically continuous movement of the coke downwardly, there is a continuous changing or agitation of the coke particles in the furnace, relatively to one another, so that no pronounced gas channels or short circuits of either gas or electric current are likely to occur, and the charge may be heated quite evenly in the respective zones. The movement also has a tendency to sift the ash downwardly and to keep the surface of the coke clear for continuous chemical action, and for the satisfactory conductivity of the electric current for heating.

It is preferred, therefore, to let some of the coke go unconsumed with the ash and keep a positive movement of the material through the furnace, and then separate the unconsumed coke from the ash and return the coke to the furnace as a portion of a new charge.

In large furnaces the process may be made continuous and automatic by having a very slowly moving arrangement 14, such as an ore feeder, in the lower portion of the furnace, which will remove a complete section of the residue from the bottom, so that the charge in the furnace will settle evenly and uniformly.

If it is desired to produce hydrogen sulphide from pyritic ore instead of from sulphur dioxide from a roasting furnace, it may be done by charging broken and preferably screened sulphide ore with coke into the furnace, and introducing steam, or steam and a hydrogen containing gas, through the twyers. Or, of it is more convenient and cheaper in any specific case, the pyritic ore alone may be charged into the furnace and steam and a hydrocarbon fluid may be introduced through the twyers. If oil is used it should be vaporized before introducing it into the furnace. If desired, oil may be introduced as a liquid below the twyer zone, so that it may be vaporized by the hot descending residue.

If pyrites is charged with the coke into the furnace, the pyrites may be completely reduced, depending on the results desired. In either case the resulting product may be used as a precipitant for copper from its solutions.

If it is intended to produce sponge iron for precipitation purposes, the action is somewhat similar to the production of hydrogen sulphide. In copper mining districts, where copper is to be leached, concentrates are usually produced as a preliminary step to a more expensive and efficient treatment for the recovery of the metals in elemental form. There would be no difficulty in producing at least a part of this concentrate which would contain a very high percentage of iron. When the concentrate is roasted and leached the residue will be high in iron oxide, and it is usually from this material that sponge iron is made. Instead of using this material direct, as is usually done, I prefer to first sinter it, as described, for example, in Patents No. 839,064, December 18, 1906, and No. 1,348,407, August 3, 1920. The resulting sinter is crushed and screened to the size desired, say from 0.25 to 1.0 inch, and charged with sufficient coke into the furnace and subjected to the necessary temperature for effective reduction by means, preferably, of the electric current, as illustrated in Fig. 3 of the drawings. It may also be desirable to introduce hydrogen or a hydrogen containing fluid into the furnace, in which case the gas used, such as producer or water gas, would be generated in the gas producer 5. In this way the sintered material is reduced to metallic iron, and since the iron so produced has appreciable dimensions and is quite compact, there is little danger of unusual oxidation. Precaution should be taken, however, as in the case of the production of hydrogen sulphide, to cool the treated material in the furnace as it descends below the twyer zone. This may be done by injecting a cold reducing gas into the material below the twyer zone, through the gas injector 12. The charge descends slowly, below the twyer zone, in a lowering temperature and in a reducing or non-oxidizing atmosphere, until it reaches the outlet at the bottom, by which time it will have been cooled sufficiently to prevent appreciable re-oxidation. The metallic iron is then separated from the ash and coke, either by washing, by gravity concentration, screening, or magnetic separation, when it is ready for use. The coke should be charged into the furnace in considerable excess, and the excess is returned for re-use. The iron so produced is an ideal material for use in precipitating copper from leach solutions. The particles are not so small as to be readily oxidized, and large enough to be easily handled. The size of the iron particles can be easily regulated because the sinter can be crushed to any size desired preparatory to charging it into the furnace, and it is evident that the handling of metallic iron for precipitation, in sizes of peas or nuts is very much more convenient than handling either sponge iron as ordinarily made, or handling scrap iron which comes in all kinds of shapes and sizes. The coke, charged into the furnace with the iron oxide sinter, acts as a conductor for the electric current, especially if the coke is in considerable excess, and this makes a convenient way of getting the temperature desired.

If the furnace, as illustrated in Fig. 3, is used for sulphatizing or chloridizing ore, the mixture of sulphatized or chloridized ore, or tailing and liquid, as it is washed from the liquid seal of the furnace, may be settled in the tank 24, and the liquid returned to the liquid seal as rapidly as it is used in removing the ore from the furnace, and when it becomes sufficiently charged with the leached metals, the liquid may be diverted and the metals recovered from the liquid.

By constructing the twyers as shown, with inclined partitions forming the openings between the furnace shaft and the twyer chamber, a large opening surface is provided for introducing the gas or fluid into the material in the furnace shaft under a relatively slight pressure while the material is moving downwardly and unobstructedly in the furnace shaft without any of it entering the twyer chamber.

I claim:—

1. In metallurgical apparatus, a vertical shaft furnace divided into a heating section and a cooling section and adapted to receive the material to be treated, electrodes arranged at different elevations in the heating section for heating the material, means for injecting a reacting fluid into the heated material in the shaft, and means at the lower portion of the cooling section for removing the treated material in a substantially continuous stream.

2. In metallurgical apparatus, a shaft furnace divided into a heating and a cooling section and adapted to receive the material to be treated, means independent of the chemical reactions of the material being treated for heating the material in the heating section of the shaft furnace, means intermediate the top and bottom of the shaft for injecting a reacting fluid into the heated material, and means at the lower portion of the cooling section of the shaft for removing the treated material in a substantially continuous stream.

3. In metallurgical apparatus, a shaft furnace divided into heating and cooling section and adapted to receive the material to be treated, means independent of the chemical reactions of the material being treated for heating the material in the heating section of the shaft, means intermediate the top and bottom of the furnace for injecting a reacting fluid into the heated material, means for cooling the material in the cooling section of the shaft, and means at the lower portion of the cooling section of the shaft for removing the treated material.

4. In metallurgical apparatus, a shaft furnace divided into a heating and a cooling section and adapted to receive the material to be treated, means independent of the chemical reactions of the material being treated for heating the material, means intermediate the top and bottom of the furnace for injecting a reacting fluid into the heated material means for cooling the treated material in the cooling section of the furnace, and a liquid seal at the bottom of the shaft.

5. In metallurgical apparatus, a shaft furnace having sloping side walls at its lower portion and adapted to receive the material to be treated, electrical means for heating the material in the furnace, twyers in the lower sloping wall of the shaft for introducing a gaseous fluid into the heated material, said twyers being arranged with inclined partitions forming the openings between the furnace shaft and the twyer chamber so as to allow fluid to pass from the twyer chamber into the shaft between the inclined partitions and to allow the material being treated to move downwardly in the furnace shaft without entering the twyer chamber.

6. In metallurgical apparatus, a shaft furnace having sloping side walls at its lower portion and adapted to receive the material to be treated, electrical means for heating the material in the furnace, twyers in the lower sloping wall of the shaft for introducing a gaseous fluid into the heated material, said twyers being arranged with inclined partitions forming the openings between the furnace shaft and the twyer chamber so as to allow the gaseous fluid to pass from the twyer chamber into the shaft between the inclined partitions and to allow the material being treated to move downwardly in the furnace shaft without entering the twyer chamber, and means at the lower portion of the shaft for removing the treated material in a substantially continuous stream.

7. In metallurgical apparatus, a shaft adapted to receive the material to be treated, electrodes adapted to pass an electric current through the material in the shaft to bring the material to a reacting temperature, twyers adapted to introduce a reacting fluid into the heated material, and an injector below the twyers for introducing a cooling fluid into the treated residue.

8. In metallurgical apparatus, a shaft adapted to receive the material to be treated, means independent of the chemical reactions of the material being treated for heating the material, twyers adapted to introduce a reacting fluid into the heated material in the shaft, and an injector below the twyers for introducing a cooling fluid into the treated material residue.

9. In metallurgical apparatus, a shaft adapted to receive the material to be treated, means independent of chemical reactions of the material being treated for heating the material in the shaft, means for introducing a reacting fluid into the material in the shaft, and means for spraying a cooling liquid into the shaft above the material.

10. In metallurgical apparatus, a vertical shaft adapted to receive the material to be treated, means independent of the chemical reactions of the material being treated for heating the material, twyers for introducing a reacting fluid into the heated material in the shaft, means for separating a portion of the treated material residue from another portion, and means for returning a portion of the treated residue material to the top of the vertical shaft.

11. In metallurgical apparatus, a vertical shaft adapted to receive the material to be treated, means independent of the chemical reactions of the material being treated for heating the material, twyers for introducing a reacting fluid into the material in the shaft, a liquid seal in the lower portion of the shaft, means adapted for withdrawing the treated material residue from the shaft with a portion of the sealing liquid, and means for returning the withdrawn liquid to the liquid seal.

12. In metallurgical apparatus, a furnace comprising a shaft adapted to receive material to be treated, means independent of the chemical reactions of the material being treated for heating the material, and twyers for introducing a reacting fluid into the heated material in the shaft, said twyers being arranged with inclined partitions forming the openings between the furnace shaft and twyer chamber so as to allow fluid to pass from the twyer chamber into the shaft between the inclined partitions and to allow the material being treated to move downwardly in the furnace shaft without entering the twyer chamber.

13. In metallurgical apparatus, a furnace comprising a vertical shaft adapted to receive material to be treated, electrodes arranged to heat the material to be treated with an electric current, and twyers for introducing a reacting fluid into the heated material in the shaft, said twyers being arranged with inclined partitions forming the openings between the furnace shaft and twyer chamber so as to allow fluid to pass from the twyer chamber into the shaft between the inclined partitions and to allow the material being treated to move downwardly in the shaft without entering the twyer chamber.

WILLIAM E. GREENAWALT.